May 19, 1936.  E. A. NELSON  2,041,202
METHOD OF MAKING WHEELS
Filed Jan. 5, 1932   2 Sheets-Sheet 1
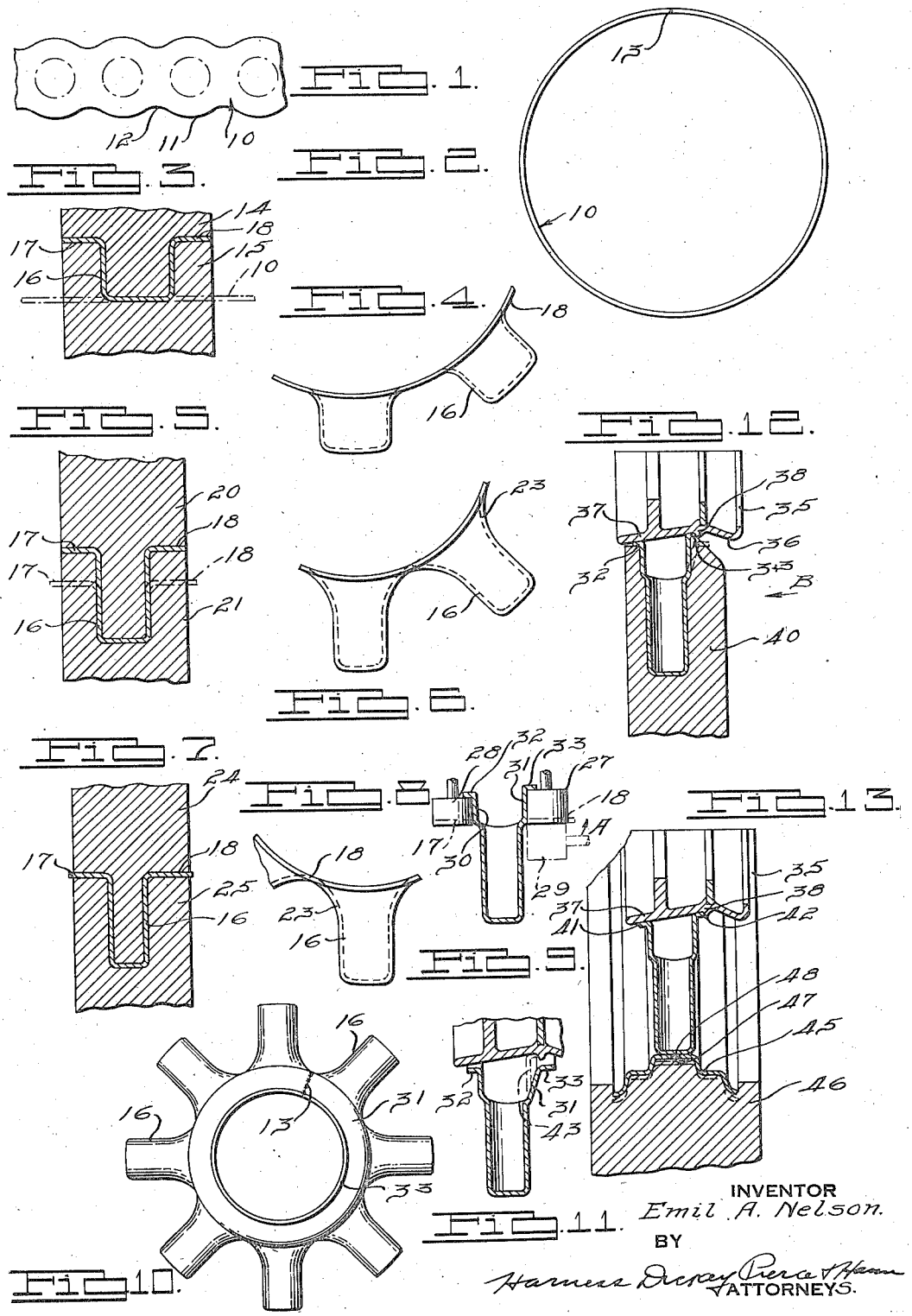
INVENTOR
Emil A. Nelson.
BY
ATTORNEYS.

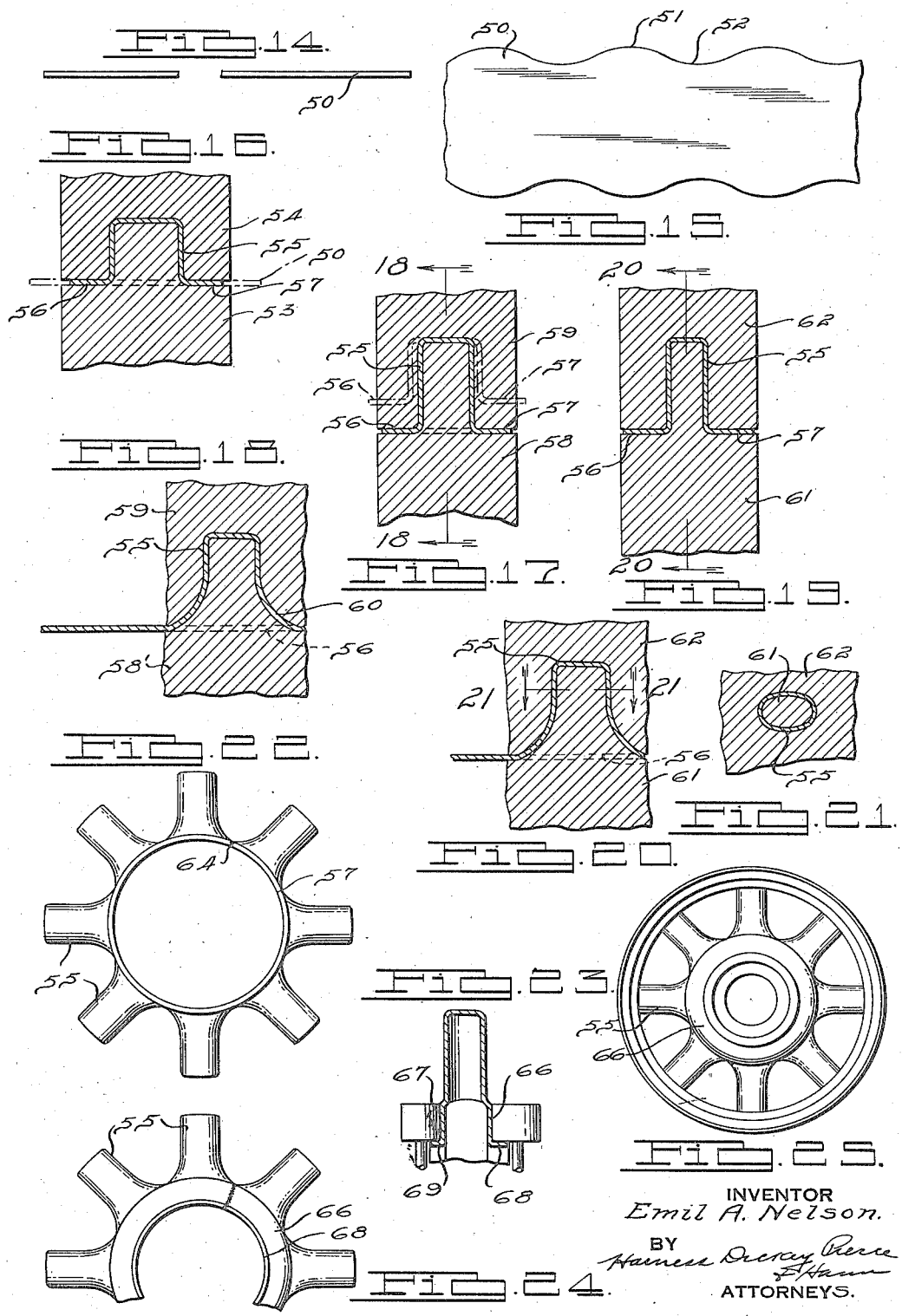

Patented May 19, 1936

2,041,202

UNITED STATES PATENT OFFICE 2,041,202

METHOD OF MAKING WHEELS

Emil A. Nelson, Detroit, Mich.

Application January 5, 1932, Serial No. 584,826

9 Claims. (Cl. 29—159.03)

The invention relates to wheels and it has particular relation to a wheel of the metal spoke type, and a method of manufacturing a wheel of this character and mounting it on a tubular hub member such as a removable hub shell.

In certain respects the invention is related to that embodied in my co-pending application for patent relating to a Method of making wheels, Serial No. 584,825, filed Jan. 5, 1932, issued as Patent No. 1,958,974 on May 15, 1934.

One object of the invention is to provide a wheel of the hollow metal spoke type, which may be manufactured integrally from sheet material, such as sheet steel. Forming a wheel of this character from a single sheet of material reduces manufacturing expenses considerably and at the same time produces a strong, desirably resilient, and light, and hence highly desirable construction.

Another object of the invention is to provide a wheel of the hollow spoke type, manufactured integrally from a sheet material such as sheet steel, in which the outer ends of the spokes are closed by material integral therewith. Particularly, in the felloeless type of wheel this arrangement is advantageous because greater rim supporting surfaces are provided at the outer ends of the spokes, and when a rim is mounted thereon, a stronger assembly may be obtained. Moreover, the closed outer ends of the spokes prevent entrance of water, dirt and other foreign matter into the hollow spaces of the wheel.

Another object of the invention is to provide a wheel construction including a tubular hub member such as a hub shell and a series of hollow spokes, in which the internal spaces provided by the hollow spoke construction, are substantially sealed against water, dirt or other foreign matter. It follows that the inside of the hollow construction will be maintained free of dirt and the like, normally found objectionable in the ordinary hollow spoke type of wheel.

Another object of the invention is to provide a wheel including a hub member such as a hub shell, and a unitary series of spokes, in which the parts are rigidly associated, by radially expanding or contracting one part against the other, such as by shrinking the spoke assembly upon the hub member.

Another object of the invention is to provide a method of manufacturing a wheel of the hollow spoke type, from a single strip or sheet of material such as sheet steel, by means of which the finished wheel will comprise a series of spokes integrally connected. This method or process decreases the expense of manufacture and at the same time enables construction of the wheel from light material.

Another object of the invention is to provide a hollow spoke wheel constructed from sheet material and a method of mounting it on a hub member, in which the spoke assembly may be rigidly mounted on the latter in an economical and efficient manner, which insures a strong assembly and location of the spokes in the proper plane of rotation.

Other objects of the invention will be apparent from the following description, the drawings relating thereto, and claims hereinafter set forth.

For a better understanding of the invention, reference may be had to the accompanying drawings, forming a part of the specification, wherein, Fig. 1 is a fragmentary, plan view of a strip or sheet of material such as sheet steel, from which the spoke part of the wheel may be manufactured;

Fig. 2 illustrates how this strip or sheet of material is bent into circular form and its ends welded to provide an annular band;

Fig. 3 illustrates the manner in which the hollow spokes are initially formed in or drawn from the annular band shown by Fig. 2, by means of a die forming operation;

Fig. 4 is a fragmentary side view of the band illustrating how the assembly initially looks after the operation illustrated with respect to Fig. 3;

Fig. 5 illustrates a second die forming operation in which the spokes are increased in radial length and simultaneously decreased in diametrical dimensions;

Fig. 6 is a fragmentary side view of the assembly after the spokes are changed in form in the manner shown in Fig. 5;

Fig. 7 illustrates the third die forming operation performed on the band, in which the spokes are again increased in radial length and made oval in cross section;

Fig. 8 is a fragmentary view of the band after the die forming operation shown by Fig. 7;

Fig. 9 illustrates a manner in which the marginal band portions at the sides of the spokes may be rolled inwardly into substantially radially planes;

Fig. 10 illustrates the wheel construction after the flange rolling operation illustrated by Fig. 9;

Fig. 11 illustrates the wheel as it may appear when initially slipped over a hub shell;

Fig. 12 illustrates the manner in which the construction shown by Fig. 11 may be shrunk on the hub shell, by means of a shrinking die;

Fig. 13 illustrates the construction shown by Fig. 10 after a rim of the drop center type has been mounted on the outer ends of the spokes;

Fig. 14 is a view similar to Fig. 1, illustrating a sheet of material such as sheet steel from which a wheel of the character previously illustrated, is to be manufactured according to another method;

Fig. 15 is a fragmentary plan view of the sheet of material shown by Fig. 14;

Fig. 16 is a cross-sectional view and particularly illustrating the first drawing operation in forming spokes in the sheet material;

Fig. 17 illustrates the second die forming operation performed on the material and the manner in which the band and spokes are changed in contour;

Fig. 18 is a cross-sectional view taken substantially along the line 18—18 of Fig. 17;

Fig. 19 is a cross-sectional view illustrating the third die forming operation;

Fig. 20 is a cross-sectional view taken substantially along the line 20—20 of Fig. 19;

Fig. 21 is a cross-sectional view taken substantially along the line 21—21 of Fig. 20;

Fig. 22 illustrates the manner in which the band thus formed with the spokes, is bent into annular form, and welded to provide an annular wheel construction;

Fig. 23 illustrates the manner in which marginal portions of the band are rolled inwardly into substantial radial planes;

Fig. 24 is a side view of the wheel, similar to Fig. 22, after the flanges are thus rolled;

Fig. 25 illustrates the assembly thus formed mounted on a hub member such as a hub shell, with a tire supporting rim on the outer ends of the spokes.

In constructing a wheel according to the method illustrated by Figs. 1 to 13 inclusive, an elongated strip of sheet material such as sheet or strip steel, indicated at 10 in Figs. 1 and 2, is provided which is of predetermined length, width and gauge. Opposed edges of the band extend in serpentine fashion longitudinally of the latter, and one edge is so formed with respect to the other that alternating wide and narrow portions 11 and 12 are obtained. It is evident that in manufacturing a number of elongated strips of material so fashioned, practically no waste of material will be incurred because in stamping a strip or strips of this type from a large sheet of material, the material at opposite sides of the strip stamped similarly will be provided with serpentine edges and like strips can be manufactured therefrom without waste. After the strip 10 is so formed, it is bent into cylindrical forms as shown by Fig. 2 and the ends are welded as indicated at 13 to form an annular band. The wider portions 11 in the band provide surplus material sections as compared to the narrow portions 12, and in drawing or die forming hollow spokes in the band, such spokes are formed substantially centrally of the wider portions. In forming hollow spokes in the band male and female die members 14 and 15 are utilized as illustrated by Fig. 3, it being preferred to form each hollow spoke separately by means of such die members. During this initial spoke forming operation, spokes of hollow construction, indicated at 16 are obtained by drawing the metal in the band radially toward its center and around the male member. The wider portions 11 coinciding with each spoke necessarily are reduced in width and at the same time marginal edge portions of the band are drawn radially toward the center thereof, thereby providing axially directed and opposed flanges 17 and 18 at the base of the spokes. It will be noted that the outer ends of the spokes are closed by metal integral with the sides thereof. Preferably the initial diameter of the band 10 will constitute the diameter of the closed or end walls of the spokes during the spoke drawing operations and in the finished wheel, although it is to be understood that the final spoke diameter may be smaller than the initial diameter of the band if this is desired. Fig. 4 is a fragmentary view of the assembly following formation of the spokes 16 by means of the die members 14 and 15.

Following the first operation described above, male and female die members 20 and 21 are employed to still further draw the metal radially toward the center of the band, to lengthen the spokes and simultaneously reduce their cross-sectional diameter. In this second die forming operation the marginal edge portions 17 and 18 of the band are still drawn further toward the axis of the latter and at the same time the width of the wider portions are reduced. It should be evident now that in drawing the spokes, the wider portions 11 of the band are gradually reduced in width and that their width approaches the width of the narrow portions 12. While some variation may occur in the width of the narrow portions 12 during the drawing operations, it is apparent that the width of the wider portions may be reduced by a much greater amount and the tendency is to finally obtain a wheel assembly with the marginal edges uniform in width. Fig. 6 illustrates the wheel assembly after the drawing operation illustrated by Fig. 5, and it will be noted that the bases of the spokes are slightly flared circumferentially of the assembly as indicated at 23.

Following the second drawing operation, male and female die members 24 and 25 as shown by Fig. 7, are employed for changing the shape of the spokes in cross section, from circular to oval form. Fig. 8 illustrates such spokes after the last mentioned drawing operation. It is to be understood that the spoke forming operations illustrated by Figs. 5 and 7, similarly to the drawing operation illustrated by Fig. 3, are preferably performed on the spoke separately.

After the final drawing operation shown by Fig. 7, rollers 27 and 28 are employed for rolling or spinning the marginal edge portions 17 and 18 toward the axis thereof, as shown by Fig. 8. It is apparent that the rollers may initially be positioned as shown in broken lines at 29 and gradually pivoted in the direction indicated by the arrow A until they finally assume positions as shown in full lines, and that during this rolling or spinning operation performed while either rotating the wheel or moving the rollers circumferentially thereof, the marginal edge portions 17 and 18 may be moved into positions where they are substantially aligned with the spokes. The length of the rollers with respect to the marginal edge portions of the wheel band and the positioning of the rollers with respect to such marginal edge portions is such that after this rolling operation, the spokes are connected by annular, axially spaced and substantially radially disposed walls indicated at 30 and 31. Also as a result of this operation, the annular walls 30 and 31 are provided respectively with legs 32 and 33 at their inner peripheral edges, and such legs are directed in axially opposed directions and away from opposite sides of the wheel.

In forming the wheel by means of the above described die drawing operations, preferably the width of the marginal portion or flange 18 is greater than the width of the marginal edge portion or flange 17 so that the wall 31 and the leg 33 as shown by Fig. 8, have a slightly smaller inner peripheral diameter than the wall 30 and leg 32, it being apparent that the rollers employed for spinning or rolling the flange 18 may be of appropriate dimensions so as to bend the flanges 17 and 18 in the manner outlined.

The spoke assembly is particularly adapted to be mounted on a hub shell 35 illustrated by Fig. 12, and this hub shell and the method of manufacturing the same comprise particularly a part of the invention embodied in my co-pending application mentioned previously. The shell has its upper surface formed to provide a tapered portion 36 adjacent the outer end of the shell and an oppositely tapered portion 37 extending to the inner end of the shell. The tapered portions 36 and 37 diverge outwardly from approximately an annular shoulder 38 located substantially at the junction of the taper surfaces. In the wheel assembly as finally constructed, the inner surface diameters of the legs 32 and 33 are such that they can be moved laterally over the hub shell in the direction indicated by the arrow B until they are located in the plane of the tapered surface 37. The inner surface diameter of the leg 32 may be such that the wheel can be moved laterally over the shell in the direction stated and the leg brought forcefully into engagement with the tapered surface 37 adjacent the inner end of the shell or the diameter of such leg may be such that when it is in proper position a space may be provided between the leg and the tapered surface. The wheel is properly located on the shell when the outer marginal edge of the leg 33 is substantially aligned with that side of the shoulder 38 adjacent the tapered surface 37. Preferably the arrangement is such that when the wheel is so positioned on the shell both legs 32 and 33 are equally spaced from the tapered surface 37. Then as shown particularly by Fig. 12 a shrinking die 40 may be employed to shrink the spoke assembly radially toward the axis of the shell until the legs 32 and 33 are brought forcefully into engagement with the tapered surface 37. It is apparent that the entire spoke assembly may be so shrunk or that portions thereof may be shrunk to obtain this result. It may be desirable to initially have the leg 32 forcefully engage the tapered surface 37 adjacent the inner end of the hub shell so as not to require any or as much shrinking thereof as the leg 33 in order to obtain forceful engagement of the legs with the shell. The shoulder 38 in conjunction with the tapered surface 37 positively prevents axial movement of the spoke assembly in either direction after the assembly has been so shrunk on the shell. Following the shrinking operation, the legs 32 and 33 may be welded to the shell as indicated at 41 and 42 to provide a rigid and tight assembly. In this connection it may be stated that the tapered surface 37 seals the opening between the walls 30 and 31 and hence in conjunction with the outer closed ends of the spokes, the entire hollow construction is sealed and hence water and other foreign matter is prevented from gaining ingress into the hollow spaces of the wheel.

As shown by Fig. 11, the wheel may be constructed with its wall 31 inclined to the axis of the wheel, and the leg 33 consequently displaced axially from the plane of the spoke. In this construction the legs 32 and 33 finally may have the same inside diameter although the walls 31 and 32 will have different lengths. A wheel of this character may be assembled with the shell either by having the diameter of the leg 32 such that in moving the wheel laterally over the shell the leg forcefully engages the tapered surface 37 or a space may be provided between the leg 32 and the tapered surface when the wheel is properly positioned. A wheel of this type may be shrunk on the shell by means of a suitable shrinking die, which deflects and/or shrinks the annular wall and leg 33 into the broken line position indicated at 43 in Fig. 11, or if the leg 32 does not initially engage the shell, both legs or the entire assembly may be shrunk to obtain proper engagement with the shell.

After the wheel is assembled with the hub shell, a rim 45 shown as of the drop center type, may be mounted on the outer end of the spokes and shrunk thereon if desired by means of a suitable shrinking die indicated at 46. If the rim is shrunk on the spokes it is evident that some shrinking of the spokes may simultaneously occur which will further insure proper shrinkage of the spoke assembly with respect to the hub shell. Preferably the base of the rim is provided with openings or slots indicated at 47 at the outer ends of the spokes, and the spokes are secured to the base of the rim by means of arc welding to provide a welding connection indicated at 48.

Figs. 14 to 25 inclusive relate to another method of constructing the wheel. As shown by Figs. 14 and 15, an elongated strip of sheet material such as sheet or strip steel, indicated at 50 is provided, and such strip has opposite edges formed in serpentine relation as described with respect to Fig. 1. This arrangement similarly provides wider portions indicated at 51 and narrow portions indicated at 52 and it will be understood that the hollow spokes to be formed will be located substantially centrally of the wider portions 51. In the initial drawing operation male and female die members 53 and 54 are utilized and preferably each spoke indicated at 55 is formed separately, or in other words the several spokes are formed in succcessive operations. During this operation the marginal edge portions of the strip indicated at 56 and 57 decrease in width as the material is drawn into spoke formations. Here again, the serpentine edges of the strip tend to straighten during the spoke forming operations and it should be understood that when the spokes are finally formed, the edges of the strip are substantially straight and parallel and it will be recalled that this result also was obtained by the first method described in connection with Figs. 1 to 13 inclusive.

The second spoke drawing operation is illustrated by Fig. 17, in which male and female die members 58 and 59 are employed. During this operation the spokes are reduced in cross-sectional diameter as well as in length and at the same time the marginal edges of the material are again reduced in width in the manner previously described. Fig. 18 illustrates the spoke construction following the die forming operation shown by Fig. 17 and it will be noted that the base portions of a spoke are circumferentially flared as indicated at 60. In the next die forming operation indicated by Fig. 19, male and female die members 61 and 62 are employed, and the shape of the spokes is changed from circular to oval as shown in Fig. 21. Figs. 20 and 21 illustrate cross-sectional views of the spokes obtained during the die forming operation illustrated by Fig. 19.

The assembly is then bent into annular form as shown by Fig. 22 and the ends thereof are welded as indicated at 64. Following this operation the marginal edge portions 56 and 57 are spun or rolled toward the axis of the wheel to provide annular walls 66 and 67 and legs 68 and 69. It is apparent that the marginal edge portions 56 and 57 may be so arranged, constructed and spun or rolled to provide annular walls and axial legs so as to obtain a wheel construction of any of the types described with respect to Figs. 9, 11, and 12 previously described. The assembly thus provided is illustrated by Fig. 24 and it is apparent that it may be mounted on the hub shell in any of the ways previously described and that a rim may be shrunk or otherwise secured on the outer ends of the spokes, so as to obtain finally a wheel construction including a hub shell and rim as shown by Fig. 25.

It will be apparent from the foregoing description, that two forms of the invention principally have been provided which are distinguished manifestly by the fact that the spokes in the one case are provided after the band is made annular in form, while in the other case the spokes are made before the band is shaped into annular form. In both cases the final constructions are substantially similar and may be mounted on a hub shell in substantially the same varied ways. Similarly, the rim may be mounted on both constructions in substantially the same way. It is manifest that a wheel so constructed is light and extremely strong because of the hollow construction both in the spokes and in the annular portion connecting the spokes and extending around the hub shell, and that it may be manufactured inexpensively because of the relatively few operations required in its manufacture. Moreover, by stamping strips of sheet material having alternating wider and narrow portions, it is apparent that little waste will be incurred because in forming the edges on one strip the desired edges will be formed on the material at opposite sides thereof, and the latter may then be fashioned into other strips without waste. Moreover, providing the serpentine edges is advantageous because the wider portions of the strip may be utilized for providing a surplus of material required in forming the spokes and, moreover, during the spoke forming operations, the edges tend to become straight and parallel, thus practically eliminating any trimming that might otherwise be required to provide substantially straight and parallel edges in the final wheel construction.

Aside from the above it is manifest that a hollow wheel construction has been provided in which the hollow spaces are positively sealed and consequently water, dirt and other foreign matter will be prevented from ingress thereto and this is hightly advantageous because it eliminates spaces in the wheel which otherwise might collect such foreign material. Additionally, it is apparent that the wheel as finally assembled with respect to the hub shell, is properly aligned in the plane of rotation, the annular shoulder 38 serving to locate and align the wheel as well as preventing its axial movement in either direction in conjunction with the tapered surface on the hub shell.

Although more than one form of the invention has been illustrated and described in detail, it will be apparent to those skilled in the art that various modifications may be made without departing from the scope of the appended claims.

I claim:

1. The method of forming a hollow spoke wheel, which comprises forming an annular band of sheet material, and drawing the material radially and inwardly between and around circumferentially spaced radial lines.

2. The method of forming a hollow spoke wheel, which comprises forming an annular band of sheet material, and drawing the material radially and inwardly between and around circumferentially spaced radial lines and simultaneously forming hollow spokes with such radial lines as axial centers.

3. The method of forming a hollow spoke wheel which comprises forming an elongated strip of material with alternating wider and narrow portions, and forming hollow spokes from the wider portions.

4. The method of forming a hollow spoke wheel which comprises forming an elongated strip of material with serpentine edges to provide alternating wide and narrow portions, and forming hollow spokes from the wider portions.

5. The method of forming a hollow spoke wheel, which comprises forming an annular band of sheet material, and drawing the material radially between and around circumferentially spaced radial lines.

6. The method of forming a hollow spoke wheel which comprises forming an elongated strip of material with alternating wider and narrow portions, forming hollow spokes from the wider portions, and then bending the strip into annular form and welding the abutting edges.

7. The method of producing a spoke spider from a strip of sheet metal which comprises forming a plurality of spaced apart corresponding scallops at the opposite edges of the strip of metal, die drawing the metal between the scallops to form a plurality of hollow spoke members, bending the strip into hoop formation, and securing the adjacent ends of the strip together to preserve the hoop formation thereof.

8. The method of forming a hollow spoke wheel, which comprises providing a strip of material with spaced portions from which the spokes are to be drawn respectively, providing substantial reliefs in the material between the first portions, and then drawing spokes from the first portions.

9. The method of forming a hollow spoke wheel, which comprises providing a strip of material with spaced portions from which the spokes are to be drawn respectively, removing substantial amounts of the material between the first portions, and then drawing spokes from the first portions.

EMIL A. NELSON.